US012424758B2

(12) United States Patent
Sodki et al.

(10) Patent No.: US 12,424,758 B2
(45) Date of Patent: Sep. 23, 2025

(54) RADIOFREQUENCY ANTENNA FOR A SATELLITE

(71) Applicant: Centre National d'Études Spatiales, Paris (FR)

(72) Inventors: Mehdi Sodki, Maureville (FR); Ornella Blanc, Toulouse (FR)

(73) Assignee: Centre National d'Études Spatiales, Paris (FR)

( * ) Notice: Subject to any disclaimer, the term of this patent is extended or adjusted under 35 U.S.C. 154(b) by 84 days.

(21) Appl. No.: 17/981,059

(22) Filed: Nov. 4, 2022

(65) Prior Publication Data

US 2023/0223700 A1 Jul. 13, 2023

Related U.S. Application Data

(63) Continuation of application No. PCT/FR2021/050762, filed on May 3, 2021.

(30) Foreign Application Priority Data

May 4, 2020 (FR) ..................................... 20/04388

(51) Int. Cl.
*H01Q 11/08* (2006.01)
*H01Q 1/28* (2006.01)
*H01Q 1/36* (2006.01)

(52) U.S. Cl.
CPC ........... *H01Q 11/086* (2013.01); *H01Q 1/288* (2013.01); *H01Q 1/362* (2013.01)

(58) Field of Classification Search
CPC ....... H01Q 1/288; H01Q 1/362; H01Q 11/086
See application file for complete search history.

(56) References Cited

U.S. PATENT DOCUMENTS 9,742,058 B1 * 8/2017 O'Neill, Jr. .............. H01Q 1/08
2008/0094307 A1 * 4/2008 Cowles .................... H01Q 9/27 343/895
2017/0310013 A1 * 10/2017 Muesse .................. H01Q 1/362

FOREIGN PATENT DOCUMENTS

WO 2017120478 7/2017

OTHER PUBLICATIONS

G. O'Neill, "Quadrifilar Helical Antenna," 2016 International Workshop on Antenna Technology (iWAT), Cocoa Beach, FL, USA, 2016, pp. 116-118 (Year: 2016).*
Fort Wayne Metals. Nitinol. Retrieved Jul. 12, 2024, from https://fwmetals.com/what-we-do/materials/nitinol (Year: 2024).*
"Pseudoelasticity." Wikipedia: The Free Encyclopedia. Wikimedia Foundation, Inc, Jul. 22, 2004, en.wikipedia.org/wiki/Pseudoelasticity. Accessed Jul. 12, 2024. (Year: 2024).*
(Continued)

*Primary Examiner* — Hoang V Nguyen
*Assistant Examiner* — Amal Patel
(74) *Attorney, Agent, or Firm* — Burris Law, PLLC; Stephenie L. W. Serman

(57) ABSTRACT

A radiofrequency antenna is adapted to be mounted on a spacecraft. The radiofrequency antenna includes four helical strands of a super elastic shape memory alloy and is configured to move from a deployed configuration to a constrained stacking configuration and to return autonomously to the deployed configuration.

19 Claims, 2 Drawing Sheets

(56) References Cited

OTHER PUBLICATIONS

International Search Report issued in corresponding International Application PCT/FR2021/050762, mailed Sep. 21, 2021.
O'Neill, G., Deployable Small Satellite Antenna—Quadrifilar Helical Antenna, pp. 116-118, IEEE, 2016.
Huang, Weimin, Shape Memory Alloys and their Application to Actuators for Deployable Structures, Ph.D. Dissertation, University of Cambridge Department of Engineering, 192 pgs., Mar. 1998.

* cited by examiner

RADIOFREQUENCY ANTENNA FOR A SATELLITE

CROSS-REFERENCE TO RELATED APPLICATIONS

This application is a continuation of International Application No. PCT/FR2021/050762, filed on May 3, 2021, which claims priority to and the benefit of French Patent Application No. FR 20/04388 filed on May 4, 2020. The disclosures of the above applications are incorporated herein by reference.

FIELD

The present disclosure relates to a super elastic shape memory alloy radio frequency antenna.

BACKGROUND

The statements in this section merely provide background information related to the present disclosure and may not constitute prior art.

Today, there is a desire to minimize the volume allocated to equipment on satellite platforms in order to make it compatible with the volume available under a fairing of a launcher. This desire is also applicable to nano-satellite platforms whose volume must be compatible with the dispensers which provide the maintenance of the satellite during the cruise.

It is known from the prior art the use of Shape Memory Alloys which make it possible to modify the geometry of a satellite equipment structure to meet this need for miniaturization.

The document U.S. Pat. No. 9,742,058 describes a shape memory alloy antenna comprising Nitinol which needs to be heated to regain its initial shape.

The Quadrifilar Helical Antenna—Greg O'Neill document describes a shape memory alloy antenna comprising Nitinol which needs to be heated to regain its initial shape.

A Shape Memory Alloy is a metal alloy which, after permanent deformation at low temperature, regains its initial shape by metallurgical transformation caused by heating. This type of alloy also makes it possible to manufacture deployable structures.

For some space applications, however, it is very difficult to design and implement reliable and efficient heating, especially since this involves the use of a heating system which induces both a complexity of implementation and sometimes a substantial cost.

In addition to the technical issues related to the heating circuit (integration, reliability, control), the heating of this type of alloy involves having a sufficient electrical budget in flight.

However, small platforms, nano satellites in one form, do not always have sufficient electrical power to embed this type of technology.

These and other issues are addressed by the teachings of the present disclosure.

SUMMARY

This section provides a general summary of the disclosure and is not a comprehensive disclosure of its full scope or all of its features.

In one form, the present disclosure finds particularly interesting applications in the field of aerospace, in one form for satellites and rovers.

The present disclosure provides, in one aspect, a radio frequency antenna adapted to be mounted on a space vehicle. The antenna includes four helical super elastic shape memory alloy strands and is configured to pass from an expanded configuration to a constrained stacking configuration and back to an expanded configuration autonomously.

The term "super elastic shape memory alloy" means a material which has super elastic properties conferred by its composition and by a heat treatment which it has undergone during its manufacture.

A material which could possess super elastic properties by its nature is not a super elastic material until it has undergone an appropriate heat treatment.

The advantage of super elastic shape memory alloys is that, unlike conventional shape memory alloys which do not have super elastic properties, or which have not been heat treated during their manufacture to present their super elastic properties do not require heating to regain their shape memory.

Conventional shape memory alloys, when used, need to be heated to recover their shape memory and achieve a transformation of the material from austenite to martensite. For a shape memory alloy in its super elastic version, the structure is stable, that is to say there is total reversion of the martensite formed under stress as soon as the stress is released. The alloy does not need to be heated.

By deployed configuration is meant a natural configuration of the antenna in which the antenna, free, is functional.

By stacking configuration is meant a stacked, confined configuration of the antenna which further allows the antenna to be stored.

By configured to return to the deployed configuration autonomously, it is meant that the antenna does not require a heating system to return to its natural and functional deployed configuration when the constraint is removed, withdrawn, on order in one form. The antenna has no heating system, which also allows it not to be impacted by underlying risks such as short circuits, yield problems, etc.

The antenna is configured to return to the deployed configuration autonomously without being heated.

As long as they remain within a specific temperature range (temperature above −150° C.) and do not exceed a deformation rate, super elastic shape memory alloys have the ability to return to their initial shape without have to be heated.

Conventionally, a deformation rate of 20% is accepted. The value of the deformation rate is linked to the exact nature of the alloy, to its state obtained by heat treatment during manufacture.

An advantage of the super elastic shape memory alloy antenna is its ability to reproduce the expected geometry with precision compared to conventional shape memory alloy structures. This being due, for conventional shape memory alloys, to poor reliability of heating and/or fatigue from the memory effect generated by plastic deformations.

The super elastic shape memory alloy radiofrequency antenna can therefore be constrained, in one aspect by compression, in a small volume, in one form in a stacking configuration for storage under the fairing of the launcher and can be deployed autonomously by simple release of the constraint, without energy input and without using an auxiliary mechanism. In other words, the antenna is selfdeploying. An advantage of the antenna according to the present disclosure is therefore its autonomy.

The radio frequency antenna according to the present disclosure also has the advantage of combining deployment system and antenna function in the operational phase when it is deployed.

The space vehicle can be a satellite in one form.

According to other features of the present disclosure, the radiofrequency antenna includes one or more of the following optional features considered alone or in all possible combinations.

According to a feature, the super elastic shape memory alloy is a copper-based alloy. This alloy makes it possible to improve the electrical conductivity of the antenna.

According to a feature, the super elastic shape memory alloy is a nickel-based alloy.

According to a feature, the super elastic shape memory alloy is a titanium-based alloy.

According to a feature, the super elastic shape memory alloy is an iron-based alloy.

According to a feature, the super elastic shape memory alloy is an alloy selected from the group consisting of CuAlNi, CuAlBe, CuAlMn, FeMnAlNi, NiTiCo and NiTiX.

According to a feature, the four helical strands are connected in pairs so that the antenna has two pairs of strands.

According to a feature, the antenna is configured to operate in frequency bands comprised between 3 MHz and 10 GHz. Thus, the antenna offers a high-performance solution, compatible with all space vehicles, including nano satellite platforms.

According to a feature, the antenna is cylindrical in shape.

According to a feature, the antenna is conical in shape.

According to a feature, the antenna has a height in the deployed configuration comprised between 0.05 m and 1 m.

According to a feature, a height ratio between the stacking configuration and the deployed configuration is greater than 10. Thus, the antenna is adapted for compactness by its reduced volume under the fairing of a launcher or a dispenser thanks to the super elastic properties of the shape memory alloy.

According to a feature, each helical strand has a pitch comprised between 5 mm and 300 mm.

According to a feature, each helical strand is tubular and has a diameter comprised between 0.5 mm and 4 mm.

According to a feature, the antenna comprises a base with a diameter comprised between 20 mm and 200 mm.

According to a feature, the antenna comprises a top with a diameter comprised between 20 mm and 200 mm.

These dimensions allow the antenna to operate in the desired frequency bands, compatible with space vehicles.

According to one aspect, the present disclosure relates to a spacecraft comprising an antenna as described above.

For example, the spacecraft is a satellite such as a nano satellite.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
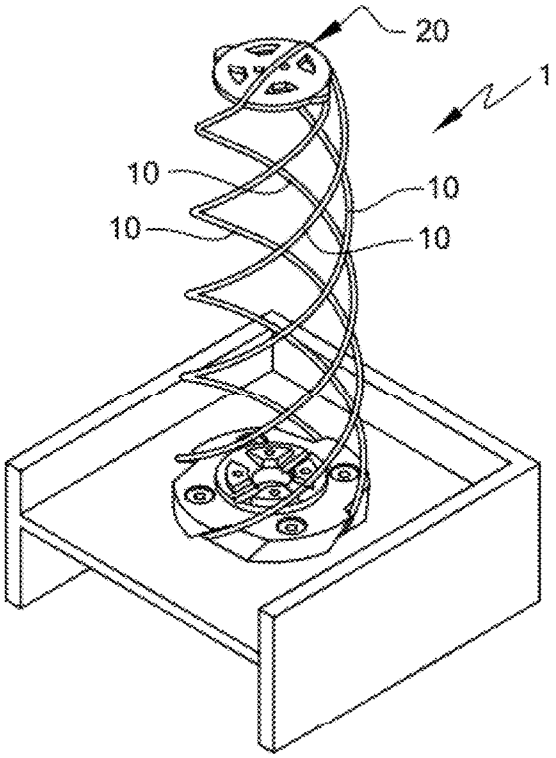
FIG. 1 shows a radio frequency antenna according to a variation in the deployed configuration.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

For the sake of simplification, identical elements are identified by identical reference signs in all of the figures.

There is shown in FIG. 1 a radiofrequency antenna 1 according to one variation of the present disclosure. The radio frequency antenna is adapted to be mounted on a space vehicle, in one aspect a satellite, in one form a nano satellite. In other words, the radio frequency antenna 1 is configured to be mounted on the satellite, in one form the nano satellite.

In this example, the radio frequency antenna 1 is a four-wire antenna. The antenna 1 comprises four helical strands 10 of super elastic shape memory alloy. The super elastic shape memory alloy has features that allow it to spontaneously return to its original shape when applied deformation constraints are removed.

In one form, the alloy is a copper-based alloy, however the antenna 1 is not limited to this type of alloy and may be made of any metal alloy having super elastic features such as Nickel-based alloys in one form.

In one form, the super elastic shape memory alloy is an alloy selected from the group consisting of CuAlNi, CuAlBe, CuAlMn, FeMnAlNi, NiTiCo and NiTiX.

The antennas formed by these alloys have demonstrated optimal behavior under the conditions and under the constraints of space in which the temperature amplitude is very high, in one form ranging from −100 to 200°.

In addition, the antennas formed by these super elastic alloys have demonstrated optimal return to the deployed position under the conditions and under the spatial constraints.

The admissible deformation rate for CuAlNi in the monocrystalline state is 10% with a super elastic behavior between 123° K. (−150° C.) and 473° K. (200° C.).

The admissible deformation rate for CuAlBe in the monocrystalline state is 20% with a super elastic behavior for a temperature between 123° K. (−150° C.) and 343° K. (70° C.).

The admissible deformation rate for CuAlMn in the monocrystalline state is 8% with a super elastic behavior for a temperature above 4° K. (−269° C.).

The admissible deformation rate for FeMnAlNi in the monocrystalline state is 10% with super elastic behavior for a temperature above 10° K. (−63° C.).

The alloys CuAlNi, CuAlBe, CuAlMn and FeMnAlNi can also be used in the polycrystalline state with an admissible deformation of 3%.

The admissible deformation rate for NiTiCo in the polycrystalline state is 5% with super elastic behavior for a temperature above 173° K. (−100° C.).

The admissible deformation rate for NiTiX in the polycrystalline state is 5% with super elastic behavior for a temperature above 163° K. (−110° C.).

The admissible deformation rate for TiNb in the polycrystalline state is 20% with super elastic behavior for a temperature above 73° K. (−200° C.).

The antenna 1 is configured to pass from a deployed configuration (FIGS. 1 and 2) to a stacking configuration (FIG. 3) by applying a constraint such as, in one form, compression and to restore its geometry to return to a self-deployed configuration. The deployed configuration corresponds to an initial position in which the antenna was manufactured. In one form, the stacking configuration, in which the antenna is retracted, constitutes a temporary state of the radio frequency antenna which allows it to be placed under a fairing of a launcher.

In one form, the four helical strands 10 are electrically linked in pairs to the top of the antenna so that the antenna comprises two pairs of strands and has a double helix architecture.

Figure 2:
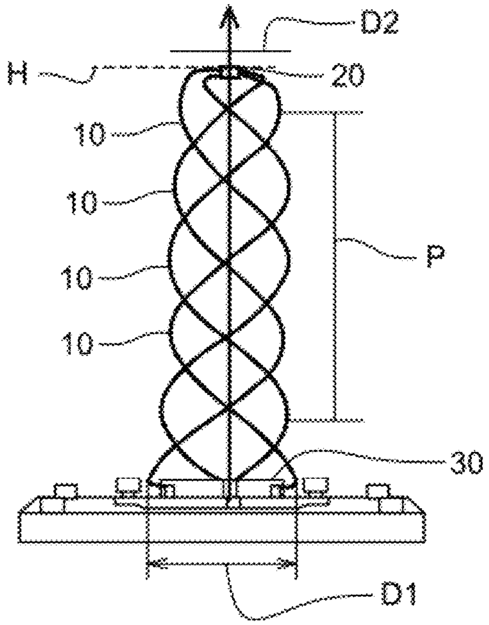
FIG. 2 shows the radiofrequency antenna according to a variation in the deployed configuration.

As shown in FIG. 2, the four strands 10 can be independent of each other so that the antenna has a helical architecture with four strands not electrically bonded in pairs.

In another form not shown, the strands 10 can all be electrically linked to the top of the antenna.

These configurations allow the antenna to operate in the frequency bands compatible with space vehicles.

In the shown variations, the antenna has a height H equal to 173 mm in the deployed configuration and equal to 20 mm in the stacking configuration.

The order of magnitude of the size ratio between the stacking and deployed configurations is 10.

In the shown forms, the antenna 1 has a conical shape including a base 30 of a diameter D1 greater than the diameter D2 of the top 20 of the antenna.

In the shown variations, the diameter D1 of the base 30 of the antenna is equal to 55 mm and the diameter D2 of the top 20 is equal to 42 mm.

In the shown forms, the helical strands are tubular and have a diameter equal to 1.5 mm.

Each helical strand 10 forms a helix, with constant pitch P. In the shown form, the pitch P of each strand 10 is equal to 114 mm.

In a non-shown variant, the antenna can be cylindrical in shape. In this configuration, the diameter D1 of the base 30 of the antenna is equal to the diameter D2 of the top 20 of the antenna.

The dimensions of the antenna 1 previously described allow the antenna to be configured to operate in a frequency band equal to 1.7 GHz.

However, the present disclosure at this frequency band and the person skilled in the art will be able to modify the dimensions of the antenna so that the latter is configured to operate in frequency bands between the HF band (in the range of 3 MHz) and the X band (in the range of 10 GHz).

A method for manufacturing the radiofrequency antenna 1 is described below.

Each strand 10 is formed in the super elastic shape memory alloy and the dimensions allow the antenna to operate in the selected frequency band.

The strands 10 are placed on a tool (not shown) comprising helical and circular grooves adapted to receive each of the strands 10.

The strands 10 are heated and formed on the tooling.

The radiofrequency antenna is thus manufactured in the deployed configuration (FIGS. 1 and 2) which corresponds to an initial position of the so-called first position antenna.

Figure 3:
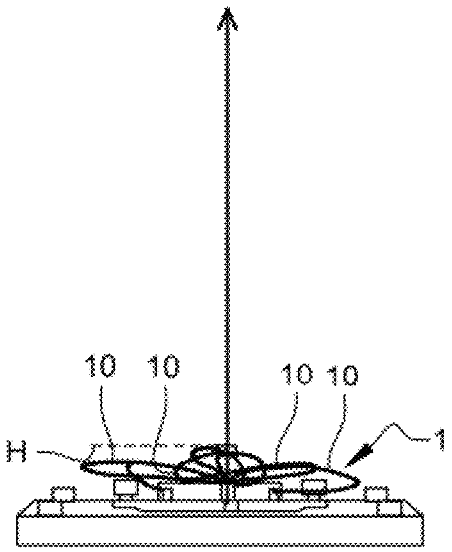
FIG. 3 shows the radiofrequency antenna according to a variation in the stacking configuration.

One application of the radiofrequency antenna illustrated in FIGS. 1 to 3 resides in its use in aerospace, in one form in the launching of nano satellites.

The radiofrequency antenna 1 is configured to occupy a stacking configuration (FIG. 3) during launch and to occupy a deployed configuration (FIGS. 1 and 2) during the operational phases of the space vehicle.

After manufacture, the antenna is maintained in a compact, so-called stacked, or stacking configuration by mechanical constraint (FIG. 3). The antenna undergoes the environments associated with the launch and cruise of the space vehicle in this configuration. After orbiting, the mechanical constraint is removed, the released antenna restores its geometry to return to the deployed configuration thanks to the shape memory alloy of the strands and without the need for heating thanks to the super elastic properties of the alloy.

Thus, the radio frequency antenna according to the present disclosure is adapted for compactness allowing nano satellite platforms to occupy a reduced volume under the fairing of the launcher and makes it possible to dispense with the heating devices of the prior art.

Obviously, the present disclosure is not limited to the examples, forms, and/or variations which have just been described and many adjustments can be made to these examples without departing from the scope of the present disclosure. In one form, the different features, forms, variants, and embodiments of the present disclosure can be associated with each other in various combinations insofar as they are not incompatible or exclusive of each other. In one form, all the variants and forms described previously can be combined with one another.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C"

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A radio frequency antenna adapted to be mounted on a space vehicle, the antenna comprising:

four helical strands of super elastic shape memory alloy and configured to pass from a deployed configuration to a constrained stacking configuration and to return to a self-deployed configuration, the super elastic shape memory alloy having the ability to return to an initial shape without having to be heated so long as the super elastic shape memory alloy remains within a temperature range and does not exceed a deformation rate, wherein the temperature range includes −150° C.

2. The antenna according to claim 1, wherein the super elastic shape memory alloy is a copper-based alloy.

3. The antenna according to claim 1, wherein the super elastic shape memory alloy is a nickel-based alloy.

4. The antenna according to claim 1, wherein the super elastic shape memory alloy is a titanium-based alloy.

5. The antenna according to claim 1, wherein the super elastic shape memory alloy is an iron-based alloy.

6. The antenna according to claim 1, wherein the super elastic shape memory alloy is an alloy selected from the group consisting of CuAlNi, CuAlBe, CuAlMn, FeMnAlNi, NiTiCo and NiTiX.

7. The antenna according to claim 1, wherein the four helical strands are connected in pairs so that the antenna comprises two pairs of strands.

8. The antenna according to claim 1, wherein the antenna is configured to operate in frequency bands between 3 MHz and 10 GHz.

9. The antenna according to claim 1, wherein the antenna is cylindrical in shape.

10. The antenna according to claim 1, wherein the antenna is conical in shape.

11. The antenna according to claim 1, wherein the antenna has a height (H) in the deployed configuration comprised between 0.05 m and 1 m.

12. The antenna according to claim 1, wherein a height ratio between the stacking configuration and the deployed configuration is greater than 10.

13. The antenna according to claim 1, wherein each helical strand has a pitch comprised between 5 mm and 300 mm.

14. The antenna according to claim 1, wherein each helical strand is tubular and has a diameter comprised between 0.5 and 4 mm.

15. The antenna according to claim 1, wherein the deformation rate includes twenty percent.

16. The antenna according to claim 1, wherein the four helical strands are configured to pass from the deployed configuration to the constrained stacking configuration and to return to the self-deployed configuration in response to a securing and a releasing of a mechanical constraint.

17. The antenna according to claim 1, wherein the four helical strands are configured to pass from the deployed configuration to the constrained stacking configuration and to linearly return to the self-deployed configuration.

18. A radio frequency antenna adapted to be mounted on a space vehicle, the antenna comprising:

four helical strands of super elastic shape memory alloy and being configured to pass from a deployed configuration to a constrained stacking configuration and to return to a self-deployed configuration in response to a securing and a releasing of a mechanical constraint, so long as the super elastic shape memory alloy remains within a temperature range, wherein the temperature range includes −150° C.

19. A radio frequency antenna adapted to be mounted on a space vehicle, the antenna comprising:

four helical strands of super elastic shape memory alloy and being configured to pass from a deployed configuration to a constrained stacking configuration and to linearly return to a self-deployed configuration, so long as the super elastic shape memory alloy remains within a temperature range, wherein the temperature range includes −150° C.

* * * * *